US009430673B1

(12) United States Patent
Bowers et al.

(10) Patent No.: US 9,430,673 B1
(45) Date of Patent: Aug. 30, 2016

(54) SUBJECT NOTIFICATION AND CONSENT FOR CAPTURED IMAGES

(71) Applicant: EMC Corporation, Hopkinton, MA (US)

(72) Inventors: Kevin D. Bowers, Melrose, MA (US); Andres Molina-Markham, Cambridge, MA (US); Nikolaos Triandopoulos, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/585,810

(22) Filed: Dec. 30, 2014

(51) Int. Cl.
*H04N 5/222* (2006.01)
*G06F 21/62* (2013.01)
*G06K 9/00* (2006.01)
*H04N 5/232* (2006.01)
*H04N 1/00* (2006.01)
*H04N 5/225* (2006.01)

(52) U.S. Cl.
CPC ....... *G06F 21/6245* (2013.01); *G06K 9/00255* (2013.01); *G06K 9/00295* (2013.01); *H04N 1/00114* (2013.01); *H04N 5/23219* (2013.01); *H04N 5/23293* (2013.01)

(58) Field of Classification Search
CPC .................. H04N 21/4223; H04N 1/00251; H04N 5/23219; H04N 5/23293; G03B 2206/00; G06K 9/00221
USPC ................ 348/207.1, 211.1–211.4, 348/333.01–333.02, 169
See application file for complete search history.

(56) References Cited

U.S. PATENT DOCUMENTS

| 7,110,666 | B2 | 9/2006 | Abe et al. |
| 2005/0280720 | A1* | 12/2005 | Kwon ..................... G06F 21/10 348/231.3 |
| 2005/0286883 | A1 | 12/2005 | Abe et al. |
| 2006/0218410 | A1* | 9/2006 | Robert ................... G07C 11/00 713/189 |
| 2007/0162971 | A1 | 7/2007 | Blom et al. |
| 2007/0216775 | A1 | 9/2007 | Yokota et al. |

(Continued)

FOREIGN PATENT DOCUMENTS

WO      2013098587 A1     7/2013

OTHER PUBLICATIONS

"H.R. 414 (111th Congress): Camera Phone Predator Alert Act," https://www.govtrack.us/congress/bills/111/hr414, Jan. 9, 2009, 2 pages.

(Continued)

*Primary Examiner* — Kelly L Jerabek
(74) *Attorney, Agent, or Firm* — Ryan, Mason & Lewis, LLP

(57) ABSTRACT

A processing device in one embodiment comprises a processor coupled to a memory and is configured to detect at least one subject in a captured image, to provide a notification to the subject regarding the captured image, and to permit the subject to consent to a particular use of the captured image by another party. The providing of the notification is controlled based on at least one of a notification threshold and an automatic consent condition. Additionally or alternatively, at least portions of the captured image are provided to the subject for review only under certain conditions, such as upon receipt of a verification that a subject device associated with the subject was sufficiently near a location at which the image was captured at a time at which the image was captured, or responsive to a result of a comparison of the captured image to known information characterizing the subject.

25 Claims, 3 Drawing Sheets

(56) References Cited

U.S. PATENT DOCUMENTS

| | | | | |
|---|---|---|---|---|
| 2009/0136221 | A1* | 5/2009 | Nakamura | H04N 1/00204 396/1 |
| 2009/0324022 | A1* | 12/2009 | Sangberg | G06F 17/30265 382/118 |
| 2010/0141778 | A1* | 6/2010 | Basson | H04N 5/232 348/207.1 |
| 2013/0201359 | A1* | 8/2013 | Wu | H04N 5/23219 348/222.1 |

OTHER PUBLICATIONS

"AT&T Cell Phones: How do I Take an Eraser Photo Using my Samsung Galaxy S4?," http://www.samsung.com/us/support/faq/FAQ00052842/62077, Feb. 26, 2014, 1 page.

B.P. Krages II, "The Photographer's Right," http://www.krages.com/ThePhotographersRight.pdf, Nov. 2006, 1 page.

*United States of America* v. *Larry Lee White*, 890 F.2d 1012 (8th Cir. 1989), Jun. 12, 1989, 2 pages.

*U.S.* v. *Allen*, 106 F.3d 695 (6th Cir. 1997), Feb. 10, 1997, 9 pages.

M. Lentz et al., "SDDR: Light-Weight, Secure Mobile Encounters," Proceedings of the 23rd USENIX Conference on Security Symposium (SEC), Aug. 2014, pp. 925-940.

F. Roesner et al., "World-Driven Access Control for Continuous Sensing," Microsoft Research Tech Report MSR-TR-2014-67, May 2014, 12 pages.

N.O. Tippenhauer et al., "On the Requirements for Successful GPS Spoofing Attacks," Proceedings of the 18th ACM Conference on Computer and Communications Security (CCS), Oct. 2011, pp. 75-86.

* cited by examiner

SUBJECT NOTIFICATION AND CONSENT FOR CAPTURED IMAGES

FIELD

The field relates generally to imaging, and more particularly to techniques for controlling usage of images.

BACKGROUND

Today, it is not uncommon for people to carry their mobile phones with them at all times. Most of these mobile phones have the capability to capture photographs or video, dramatically increasing the number of images that are captured. There is some legal basis for the expectation that subjects in captured images should control the use of their respective likenesses in those images, including what is known as the "right of publicity." However, with the proliferation of social networking, and its associated posting and sharing of images, and the increasing ease with which those images can be captured using mobile phones and other capture devices, such rights are quickly being eroded.

One of the biggest limitations to enforcing these and other similar rights is surreptitious photographing in which the subject does not realize that his or her photograph has been taken. Although a subject may be able to hear the click of a physical camera shutter when a photograph is taken, this sound is easily obscured or drowned out by other noises, and digital cameras may not click at all as there is no physical shutter. Efforts to legislate a requirement that all cameras emit an audible sound when an image is captured have so far been unsuccessful. Moreover, even if digital cameras were required by law to emit an audio notification, such a notification has a limited range, can easily be suppressed by other noise sources, has a limited temporal window during which it is effective, and is reliant on the listening capability of the subject. Accordingly, techniques are needed that provide subjects with more effective control over the use of their likenesses in captured images.

SUMMARY

Some illustrative embodiments of the present invention provide subject notification and consent for captured images. For example, one or more embodiments are illustratively configured to provide a subject with notifications that his or her photograph has been taken or that his or her likeness otherwise appears in one or more captured images. These notifications are hard to suppress, can propagate as far as necessary and can persist until the subject has time to respond. Moreover, the subject may be provided with an ability to review such images and to consent to use of such images by others. This review and consent ability is advantageously provided without adversely impacting the privacy of other subjects in the captured images or the photographer or other individual that captured the images.

In one embodiment, a processing device comprises a processor coupled to a memory and is configured to detect at least one subject in a captured image, to provide a notification to the subject regarding the captured image, and to permit the subject to consent to a particular use of the captured image by another party. The providing of the notification is controlled based on at least one of a notification threshold and an automatic consent condition.

Additionally or alternatively, at least portions of the captured image are provided to the subject for review only under certain conditions, such as upon receipt of a verification that a subject device associated with the subject was sufficiently near a location at which the image was captured at a time at which the image was captured, or responsive to a result of a comparison of the captured image to known information characterizing the subject.

The above-noted embodiments are examples of what are also referred to herein as "notification-based consent" embodiments.

In other embodiments, controlled notification of a detected subject is not necessarily provided, but instead one or more default policies associated with the detected subject are utilized to control image capture. Such embodiments are also referred to herein as "proactive consent" embodiments.

In an embodiment of this type, a processing device comprises a processor coupled to a memory and is configured to detect at least one subject in a potential captured image, to determine one or more default policies associated with the subject, and to present information relating to the one or more default policies for use in determining if the potential captured image should actually be captured.

The potential captured image may be presented in a viewfinder of a capture device prior to image capture in conjunction with a particular focusing operation of the capture device, and the capture device may be configured to prevent actual capture of the potential captured image presented in the viewfinder until the one or more default policies are satisfied.

For example, a photographer can adjust the potential captured image using the viewfinder and one or more additional focusing operations or other types of operations of the capture device until there are no unsatisfied default policies relating to any subject remaining in the adjusted potential captured image, and then capture the adjusted potential captured image.

These and other illustrative embodiments described herein include, without limitation, methods, apparatus, systems, and articles of manufacture comprising processor-readable storage media.

DETAILED DESCRIPTION

Illustrative embodiments of the present invention will be described herein with reference to exemplary information processing systems and associated mobile phones, computers, servers or other types of processing devices. It is to be appreciated, however, that the invention is not restricted to use with the particular illustrative system and device configurations shown. Accordingly, the term "information processing system" as used herein is intended to be broadly construed, so as to encompass, for example, any processing system comprising at least one processing platform, including systems comprising virtual machines and other types of public or private cloud infrastructure.

Figure 1:
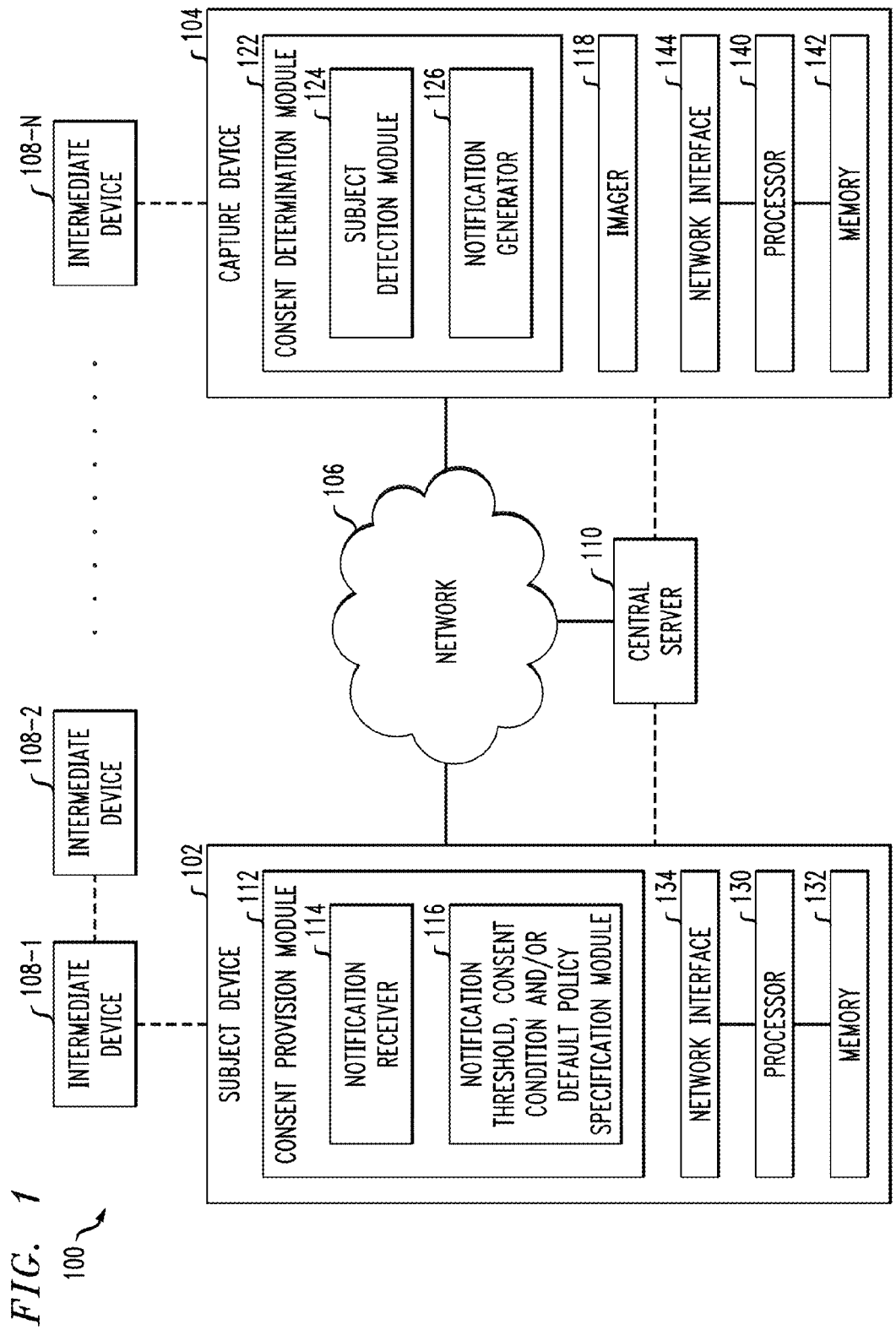
FIG. 1 shows an information processing system configured to provide subject notification and consent for captured images in an illustrative embodiment.

FIG. 1 shows an information processing system 100 configured in accordance with an illustrative embodiment of the invention. The system 100 comprises a subject device 102 and a capture device 104 that communicate with one another over a network 106. The system 100 further comprises a set of intermediate devices 108-1, 108-2, ... 108-N, at least a subset of which may also be coupled to the network 106. The intermediate devices 108 communicate with each other and the subject and capture devices 102 and 104 via one or more additional communication channels not necessarily implemented over the network 106, as shown by dashed lines in the figure.

Also included in the system 100 is a central server 110 that is coupled to the network 106 and configured to communicate with one or more of the subject and capture devices 102 and 104 over the network 106. Communications between the central server 110 and one or both of the subject and capture devices 102 and 104 can additionally or alternatively occur over communication channels not necessarily implemented over the network 106, again as indicated by dashed lines in the figure.

Although the FIG. 1 embodiment illustratively includes both the set of intermediate devices 108 and the central server 110, other embodiments can include the set of intermediate devices 108 or the central server 110, depending upon the particular implementation of the system. Moreover, in other embodiments, both the intermediate devices 108 and the central server 110 can be eliminated, with the subject notification and consent functionality being implemented utilizing only the subject and capture devices 102 and 104 communicating with one another over the network 106 and/or through other communication channels. Numerous alternative arrangements of other processing devices are possible in other embodiments.

The subject and capture devices 102 and 104 are illustratively implemented as respective mobile phones, with at least the mobile phone corresponding to capture device 104 incorporating a camera or other image capture functionality, although other implementations of these devices are possible. For example, a given one of the devices 102 and 104 can instead comprise a laptop or tablet computer, or other type of processing device. Also, the capture device 104 can illustratively comprise a stand-alone camera or other type of imaging device or component of an image capture system.

It is also possible for a single processing device to operate as both a subject device and as a capture device. Thus, either or both of the devices 102 and 104 can include both subject device and capture device functionality. In fact, the devices 102 and 104 can in some embodiments comprise different instances of the same device, such as the same model of mobile phone. Moreover, one or more of the intermediate devices 108 may additionally be configured to operate as at least one of a subject device and a capture device relative to one or more of the other devices of the system 100.

At least the capture device 104 is configured to capture images. Such images may comprise, for example, still images, video or other types of images, as well as combinations of multiple distinct image types. The term "image" as used herein is therefore intended to be broadly construed, so as to encompass, for example, any representation of a scene as captured by a camera or other type of imager. An image may also contain metadata indicating where and when the image was captured as well as other capture-related features like optical zoom, angle of view, resolution, etc.

The term "subject" as used herein is intended to be broadly construed and should be understood to encompass, for example, a person whose likeness appears in an image captured by the capture device 104. There may be multiple subjects in a given image and any particular subject referred to herein should not be construed as being limited to a primary subject of the given image. More generally, a "subject" as the term is broadly used herein includes anyone who appears in the field of view of an image. Also, individuals referred to herein as "subjects" may include one or more potential rather than actual subjects, as in the case of a person that receives a notification of a captured image based on proximity to the image capture location but for some reason was not within the field of view of the image.

A subject that reviews at least a portion of a captured image for purposes of granting or denying consent to a particular use of the image is also referred to herein as a "reviewer." Accordingly, in some of the described embodiments, subjects are additional or alternatively referred to as reviewers.

The subject device 102 in the present embodiment more particularly comprises a consent provision module 112 that includes a notification receiver 114 and a module 116 for setting one or more of a notification threshold, an automatic consent condition and a default policy, all relating to subject consent functionality of the system 100. Terms such as "notification threshold," "automatic consent condition" and "default policy" as used herein are intended to be broadly construed, and multiple instances of such information elements, as well as various combinations of these and other information elements, can be used in conjunction with determination of subject consent as disclosed herein. Such information elements can relate to granting of consent, withholding of consent, or combinations thereof, and additionally or alternatively one or more limitations relating to at least one of granting or withholding of consent. Granting or withholding consent is also referred to herein as providing or denying consent, respectively. Also, references herein to permitting a subject to consent should be understood to encompass permitting a user to grant or withhold consent.

The capture device 104 in the present embodiment more particularly comprises an imager 118 utilized to capture images, and a consent determination module 122 that includes a subject detection module 124 and a notification generator 126.

As indicated previously, the subject device 102 may also be configured to capture images and therefore may comprise an imager similar to imager 118, although that possible functionality of the subject device 102 is not illustrated in the figure.

The network 106 may comprise, for example, a global computer network such as the Internet, a wide area network (WAN), a local area network (LAN), a satellite network, a telephone or cable network, a cellular network, a wireless network such as a Bluetooth, WiFi or WiMAX network, or various portions or combinations of these and other types of networks.

In one possible operating scenario, subject device 102 and capture device 104 are implemented as respective mobile phones, and a photographer or other user of the capture device 104 captures an image that is determined to include a subject associated with the subject device 102. The modules 112 and 122 are illustratively configured to provide the subject with an ability to consent to use of his or her likeness in a captured image, possibly in conjunction with a review of at least a portion of the actual captured image by the subject, as will be described in more detail below.

Numerous other operating scenarios involving a wide variety of different types and arrangements of one or more processing devices are possible, as will be appreciated by those skilled in the art.

The term "user" in the context of the present embodiment is assumed to refer to a human user associated with a corresponding one of the subject device 102 or the capture device 104. For example, the subject associated with the subject device 102 is an example of a user, as is a photographer associated with the capture device 104. However, various other types of users, possibly including automated entities comprising at least one of hardware, software and firmware, may be present in other embodiments.

The subject device 102 and capture device 104 in the FIG. 1 embodiment are implemented as respective processing devices. Each such processing device generally comprises at least one processor and an associated memory.

The subject device 102 comprises a processor 130 coupled to a memory 132 and a network interface 134.

The processor 130 illustratively comprises a microprocessor, a microcontroller, an application-specific integrated circuit (ASIC), a field-programmable gate array (FPGA) or other type of processing circuitry, as well as portions or combinations of such circuitry elements.

The memory 132 illustratively comprises random access memory (RAM), read-only memory (ROM) or other types of memory, in any combination. The memory 132 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture comprises, for example, a storage device such as a storage disk, a storage array or an integrated circuit containing memory. The term "article of manufacture" as used herein should be understood to exclude transitory, propagating signals.

The network interface 134 allows the subject device 102 to communicate over the network 106 with the capture device 104, and comprises one or more conventional transceivers. The network interface 134 also supports communication between the subject device 102 and one or more of the intermediate devices 108 and the central server 110, possibly utilizing communication channels that are not part of the network 106.

At least portions of the consent provision module 112 of the subject device 102, such as portions of one or both of notification receiver 114 and module 116, may be implemented at least in part in the form of software that is stored in memory 132 and executed by processor 130.

Like the subject device 102, the capture device 104 comprises a processor 140 coupled to a memory 142 and a network interface 144.

The processor 140, like processor 130 in subject device 102, may similarly comprise a microprocessor, a microcontroller, an ASIC, an FPGA or other type of processing circuitry, as well as portions or combinations of such circuitry elements.

The memory 142, like memory 132 in subject device 102, may similarly comprise RAM, ROM or other types of memory, in any combination.

The network interface 144 allows the capture device 104 to communicate over the network 106 with the subject device 102 and comprises one or more conventional transceivers. The network interface 144 also supports communication between the capture device 104 and one or more of the intermediate devices 108 and the central server 110, possibly utilizing communication channels that are not part of the network 106.

At least portions of the consent determination module 122 of the capture device 104, such as portions of one or both of subject detection module 124 and notification generator 126, may be implemented at least in part in the form of software that is stored in memory 142 and executed by processor 140.

As noted above, the network interfaces 134 and 144 may also be used to support various types of communication with the central server 110. Such communication may but need not occur over the network 106. Additional or alternative communication channels between the subject and capture devices 102 and 104 and the central server 110 are illustratively shown as dashed lines in the figure.

It is to be understood that the particular set of elements shown in FIG. 1 for providing functionality relating to subject consent for use of a likeness in a captured image is presented by way of illustrative example only, and in other embodiments additional or alternative elements may be used. Thus, another embodiment may include additional or alternative devices and other system entities, as well as different arrangements of device modules and other components.

As mentioned previously, various elements of system 100, such as receiver 114 and module 116 of subject device 102 and module 124 and generator 126 of capture device 104, may be implemented at least in part in the form of software. Such software is stored and executed utilizing respective memory and processor elements of at least one processing device.

The system 100 may include additional or alternative processing platforms, as well as numerous distinct processing platforms in any combination, with each such platform comprising one or more computers, storage devices or other types of processing devices. For example, a separate processing platform otherwise unrelated to the devices 102 and 104 can be used to implement the central server 110.

Such processing platforms may include cloud infrastructure comprising virtual machines (VMs) and one or more associated hypervisors. An example of a commercially available hypervisor platform that may be used to implement portions of the system 100 is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products and other processing platform components may be utilized to implement at least a portion of the system 100.

Figure 2:
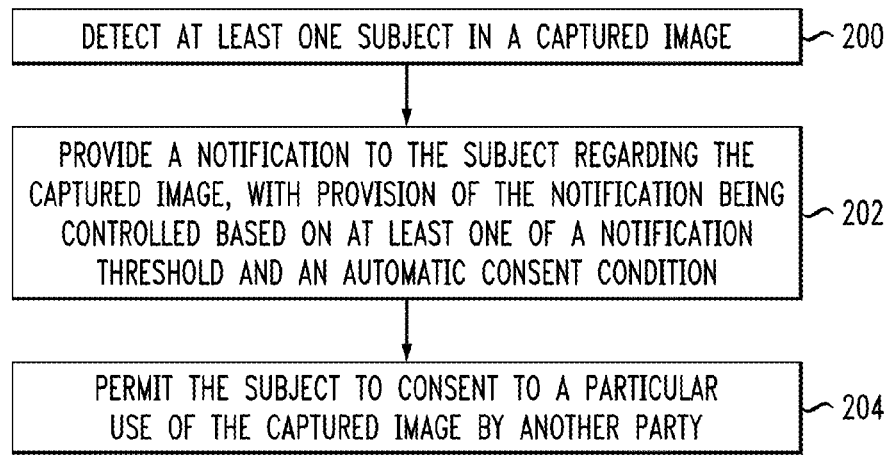
FIG. 2 is a flow diagram of an example process in a notification-based consent embodiment.
Figure 3:
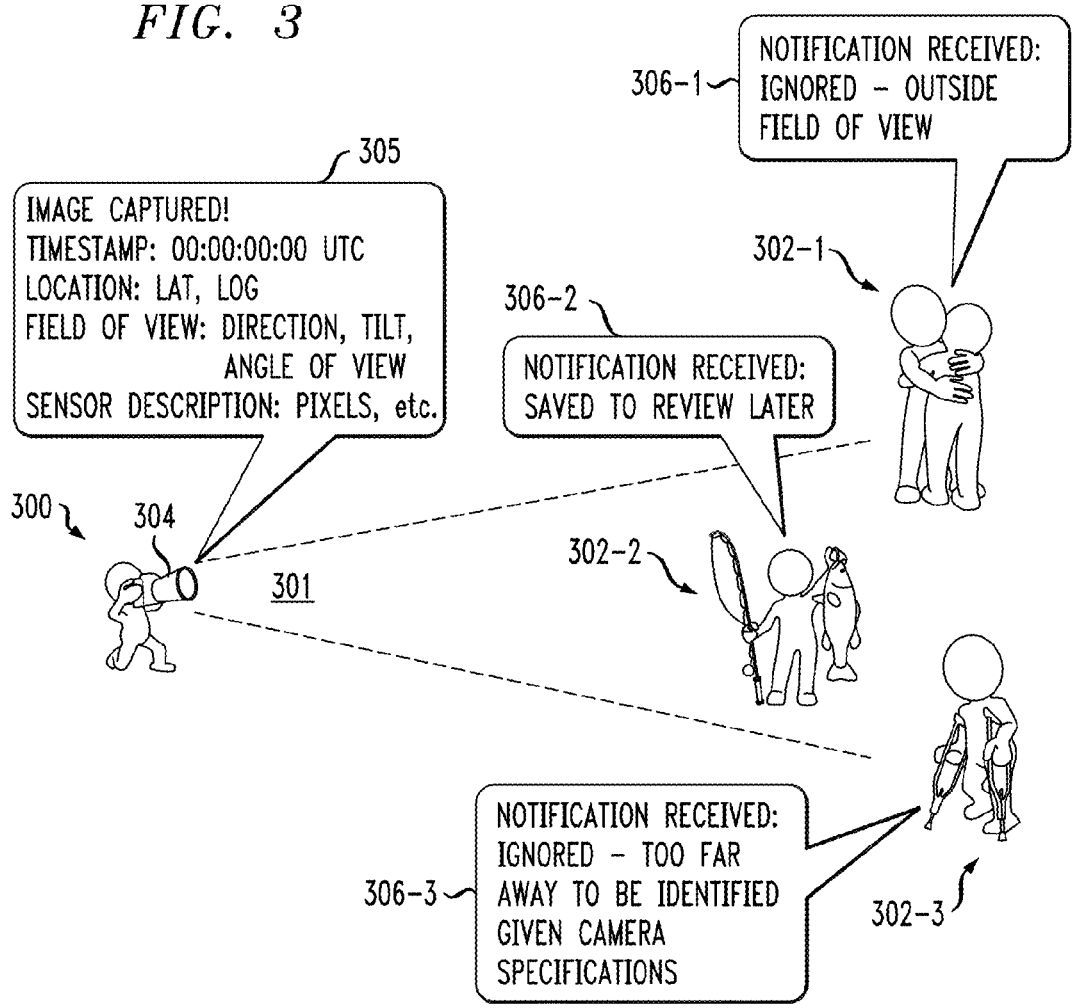
FIG. 3 illustrates notification of multiple subjects in conjunction with image capture in a notification-based consent embodiment.
Figure 4:
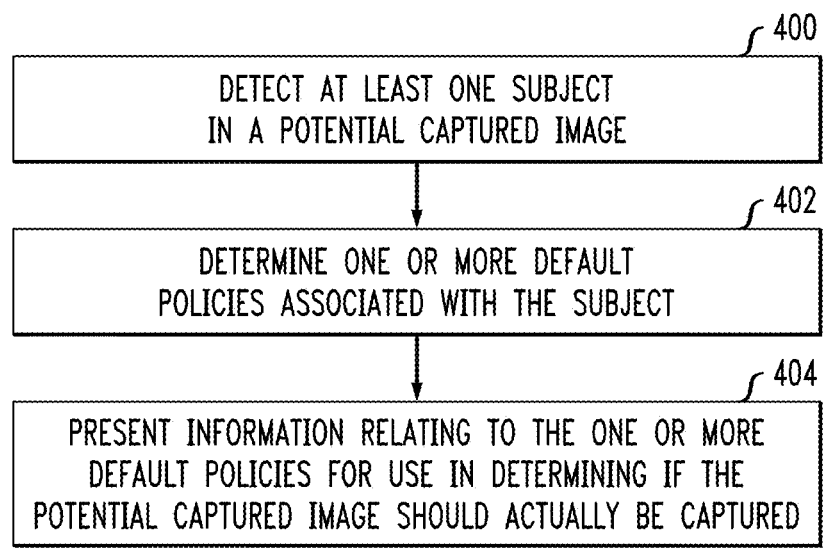
FIG. 4 is a flow diagram of an example process in a proactive consent embodiment.
Figure 5:
FIG. 5 shows an example of a viewfinder of a capture device presenting a potential captured image with consent status indications for respective subjects in a proactive consent embodiment.

Examples of processes utilizing subject consent functionality in the system 100 will now be described in more detail with reference to the flow diagrams of FIGS. 2 and 4. Additional examples relating to the processes of FIGS. 2 and 4 are shown in FIGS. 3 and 5, respectively. In the FIG. 2 embodiment, the capture device 104 provides a notification to a subject associated with the subject device 102 indicating that the subject appears in a captured image. This is an example of what is also referred to herein as a "notification-based consent" embodiment. Other embodiments need not provide such a notification to the subject, and can instead, like the FIG. 4 embodiment, take one or more default policies of the subject into account in determining whether or not to actually capture a potential captured image. Such an embodiment is an example of what is also referred to herein as a "proactive consent" embodiment. Accordingly, it is to be understood that these particular processes of FIGS. 2 and 4, and the corresponding respective related illustrations in FIGS. 3 and 5, are exemplary only, and additional or alternative processes can be carried out in other embodiments.

Referring now to FIG. 2, the notification-based consent process as shown includes steps 200, 202 and 204, which are illustratively assumed to be performed by the capture device 104. However, one or more of these steps may be performed at least in part by other components of the system 100 in other embodiments.

In step 200, at least one subject is detected in a captured image. The captured image is assumed to comprise a still image, video or other type of image captured using the imager 118 of the capture device 104. The detection of the subject in the captured image is performed by the subject detection module 124, possibly using well-known image processing techniques such as facial recognition algorithms. In conjunction with detecting a given subject, the capture device 104 may interact with the central server 110 to obtain information that can be utilized to facilitate identification of the subject, such as templates or other types of known information relating to one or more potential subjects.

It should be noted, however, that "detection" in this step and elsewhere herein in the context of module 124 is intended to be broadly construed so as to encompass arrangements in which subjects are detected generally, for example, as in a determination that there are one or more subjects present in the captured image, as well as arrangements in which subjects are detected specifically, for example, in terms of identifying at least one of the subjects in the captured image as a particular individual.

In some embodiments, detection of subjects in a captured image can make use of thermal imaging functionality of the capture device 104. For example, the capture device 104 can be equipped with an otherwise conventional thermal imager that is used to facilitate determination of presence and location of subjects in a captured image. Such thermal imaging information could be stored as image metadata in conjunction with image capture. Other types of image processing functionality of the capture device 104 can similarly be used to facilitate the detection of one or more subjects in a captured image.

In step 202, a notification is provided to the subject regarding the captured image. It is assumed that the detected subject is the subject associated with the subject device 102. A notification is provided by the notification generator 126 of the capture device 104 for delivery to the notification receiver 114 of the subject device 102. Numerous types of provision of one or more notifications to a subject may be used. For example, a notification can be provided to a subject by transmitting the notification itself to the subject device 102. As another example, a notification may be provided to a subject by causing the notification or information derived therefrom to be presented on a user interface of the corresponding subject device 102. As yet another example, a notification can be provided to a subject by transmitting a message to the subject device 102 that directs the subject to visit a site provided by the central server 110. These and other examples are considered to be within the broad scope of the phrase "providing a notification to the subject" as used herein. Such provision of notification to a subject in some embodiments is implemented, for example, by sending the notification or information derived therefrom to the subject device 102 for at least partially automated processing.

The provision of the notification in step 202 is controlled based on at least one of a notification threshold and an automatic consent condition. Such thresholds or conditions can be established by the subject associated with subject device 102 through interaction with the module 116 via a corresponding user interface.

In step 204, the subject is permitted to consent to a particular use of the captured image by another party, such as a photographer or other user associated with the capture device 104 utilized to capture the image. A wide variety of different types of uses, including unlimited use or various limited uses, by numerous different types of parties, are contemplated in different embodiments. Accordingly, terms such as "particular use" and "party" as used herein are intended to be broadly construed.

The consent of the subject to the particular use may be secured in various ways. For example, the consent may be in the form of a digital signature generated on at least a portion of the notification.

In the FIG. 2 embodiment, use of a given captured image by a photographer or other party is limited based at least in part on presence or absence of the consent of the subject or subjects identified or otherwise detected within that image.

The operations of steps 200, 202 and 204 may be repeated for one or more additional iterations each corresponding to a different captured image. For each such iteration, one or more subjects are detected in the corresponding image, and an attempt is made to determine consent of each such subject as previously described.

By way of example, the notification referred to in step 202 can be delivered from the capture device 104 to the subject device 102 over the network 106 utilizing a peer-to-peer connection established between these devices. Other types of connections between the devices can additionally or alternatively be used.

As another example, the notification can be delivered from the capture device 104 to the subject device 102 via at least one of the intermediate devices 108 utilizing peer-to-peer connections established between respective pairs of the capture, intermediate and subject devices. Other types of connections involving one or more of the intermediate devices 108 can additionally or alternatively be used. As mentioned previously, in some embodiments the intermediate devices 108 are eliminated.

The two previous examples in some implementations relate to a type of notification approach also referred to herein as "peer-to-peer notification." In such arrangements, notification is provided from one device to another device using one or more peer-to-peer connections, possibly via one or more intermediate devices.

Another possible approach utilizes broadcast notifications sent from one device to multiple devices via various broadcast mechanisms. For example, the capture device 104 in some embodiments wirelessly broadcasts to one or more other devices the fact that it has just captured an image. This broadcast could occur over any available wireless channel, including, for example, cellular, Bluetooth, WiFi or WiMAX channels or other types of available channels. The capture device 104 could broadcast over multiple available channels to increase the difficulty of blocking its transmission as well as increasing the chance of it being received by the subject device 102 on at least one channel.

Some capture devices could be configured to automatically broadcast image capture notifications. Moreover, laws could be established to mandate such automatic broadcasting, in a manner similar to that proposed in House Resolution HR 414, entitled "Camera Phone Predator Alert Act," relating to mandatory audio notifications.

Broadcasts by the capture device 104 can be retransmitted by any device that receives the transmission, such as one or more of the intermediate devices 108, in order to extend the transmission radius of the capture device. Each receiving device can locally decide whether or not to retransmit based on one or more of a number of factors including, for example, wireless channel used and its transmission range, the number of times the notification was retransmitted before being received (e.g., number of hops), and physical distance from the initial transmission point if GPS or other coordinates are specified.

The above-noted broadcast notifications can also utilize fixed base stations such as WiFi access points or cellular towers, as well as other types of communication infrastructure of the system 100.

An advantage of the example peer-to-peer and broadcast notification approaches described above is that such approaches generally avoid the need for the central server 110. However, the subject generally should have his or her subject device accessible at or around the time of image capture in order to be able to grant or withhold consent responsive to a given received notification.

These and other peer-to-peer or broadcast notification embodiments should be configured such that those people notified of an image being captured are a superset of the subjects in the captured image. However, only the subjects identified or otherwise detected in the captured image should be permitted to grant or withhold their consent.

A peer-to-peer or broadcast notification can be received by a potentially large number of people who may not appear in the image. For example, at a sporting event or concert there may be 100,000 people within a small radius, all taking pictures.

Accordingly, these and other embodiments illustratively implement at least one of filtering and prioritization of notifications such that a given subject is presented with only those notifications that are likely to be relevant to him or her.

Filtering and prioritization of notifications can be implemented by the notification receiver 114 of the subject device 102 using one or more notification thresholds established using the module 116. For example, the notification receiver 114 can be configured to determine one or more notification thresholds relating to the subject, and to present or otherwise provide the notification to the subject only if the one or more notification thresholds are met. At least one of the one or more notification thresholds may be established by the subject, possibly through interaction with module 116 via a corresponding user interface.

A given notification threshold can be based at least in part on a field of view of the capture device 104 utilized to capture the image relative to the location of the subject device 102 at the time of image capture. For example, given the location and orientation of the capture device 104, and information about the captured image (e.g., optical zoom, angle of view, resolution, etc.), a field of view could be computed. Subject devices that are aware of their respective locations at the time the image was captured need only allow the corresponding subjects to review images for which the subject devices were in the field of view at that time. At a sporting event where most of the photographs are of action on the field, this alone would dramatically reduce the number of notifications. To compensate for location imprecision, field of view calculations could be fuzzy, for example, notifying all subject devices within a minimum distance and only those in the potential field of view further away.

Another notification threshold can be based at least in part on identifiability of the subject in the captured image. For example, based on the optical zoom and resolution of the imager, subjects may be too blurry to be identified at a given distance. This parameter can be controlled by the reviewer and presentation of the decision can be done graphically (e.g., reviewers can be shown a number of images of decreasing quality and permitted to pick the point at which they no longer feel they can be identified in the image). For those images in which they appear but are more blurry than their threshold, reviewers may provide automatic consent in accordance with an automatic consent condition.

Yet another notification threshold can be based at least in part on recognition of the subject in the captured image by a facial recognition algorithm. For example, such an algorithm could be implemented by the notification receiver 114, such that the notification is presented to the reviewer only if the algorithm determines with a specified threshold level of confidence that the reviewer appears in the captured image. The algorithm is illustratively implemented in software stored in memory 132 and executed by processor 130. In other embodiments, a facial recognition algorithm can be implemented by the subject detection module 124 and utilized to control provision of notifications by the capture device 104.

Other thresholds can be based at least in part on prioritization of image type. For example, reviewers may prioritize the images they want to review based on how close they are to the capture device, the confidence level provided by the facial recognition algorithm, and other prioritization factors.

It is also possible for a notification threshold to be based at least in part on the particular use of the captured image for which consent is sought. For example, captured images proposed to be shared privately may have a higher notification threshold than images proposed to be shared publicly.

Combinations of these and other notification thresholds are possible. For example, field of view filtering could be applied to eliminate most notifications, which could then be further filtered through a facial recognition algorithm. Reviewers could set a policy via module 116 such that they are only notified if a given captured image passes both filters.

In conjunction with providing the notification from the capture device 104 to the subject device 102, a key exchange may be initiated between the capture device 104 and the subject device 102 so as to support subsequent secure communication between the capture device 104 and the subject device 102. For example, the Secure Device Discovery and Recognition (SDDR) protocol can be used to allow the subject and capture devices to exchange keys at the time of notification, allowing the corresponding parties to securely communicate with one another later in order to support review of and consent to captured images. Additional details regarding SDDR can be found in, for example, M. Lentz et al., "SDDR: Lightweight, Secure Mobile Encounters," in Proceedings of the 23rd USENIX Security Symposium (USENIX Security 14), pp. 925-940, San Diego, Calif., August 2014, which is incorporated by reference herein.

It is also possible for a notification to be provided to the subject associated with the subject device 102 via the central server 110. For example, the subject can utilize the subject device 102 to log in to the central server 110 over the network 106 in order to obtain the notification. In such an arrangement, the notification can illustratively comprise at least a portion of a web page served by the central server 110 to the subject device 102 and presented to the subject. It should be noted that the term "central" used herein with reference to the central server 110 is intended to be broadly construed, and refers generally to an arrangement in which a server is accessible to both the subject device 102 and the capture device 104, as well as possibly one or more of the intermediate devices 108. Other server arrangements can be used in providing notifications to a given subject via its corresponding subject device 102 regarding identification or other detection of that subject in at least one captured image.

The provision of a notification to the subject associated with the subject device 102 via the central server 110 is an example of what is referred to herein as "centralized notification." Such centralized notification provides an effective alternative to the above-described "peer-to-peer notification" or "broadcast notification" in which subjects typically carry a device capable of receiving notifications at or around the time the subjects are photographed.

The centralized notification may be implemented in the form of a centrally-managed notification service. Such a service could collect all relevant information about captured images and provide a mechanism for the appropriate detected subjects to review those images. In this setting, notification need not be substantially contemporaneous with image capture, but the corresponding information could instead be stored for long periods of time, with the user being notified through email, instant message or other type of communication or by allowing the user to periodically login and provide consent.

In the centralized notification approach, subjects should generally be able to review all photos of themselves, but should not be able to claim to be someone else in order to review other photos.

Additional or alternative techniques can be utilized to limit the number of notifications generated in the system 100. For example, providing a notification to the subject regarding the captured image in step 202 of the FIG. 2 process may further comprise determining one or more automatic consent conditions relating to the subject, and providing the notification to the subject only if the one or more automatic consent conditions are not met. This functionality can be implemented by the notification receiver 114 in a manner similar to that previously described with reference to the notification thresholds. At least one of the one or more automatic consent conditions may be established by the subject, possibly through interaction with module 116 via a corresponding user interface.

Also, default policies specified using the module 116 can be used to limit the number of notifications generated in the system 100. Since the number of notifications for a given subject is potentially very large, subjects can set one or more default policies and then provide exceptions to those policies on a case-by-case basis. For example, a subject could specify a default blurring policy for publicly-shared images but encourage photographers to request an exception for certain images they would like to share.

FIG. 3 shows an example of notification of multiple subjects in conjunction with image capture using one or more techniques of the type previously described. In this embodiment, a photographer 300 captures an image having a field of view 301 and multiple subjects 302-1, 302-2 and 302-3.

The photographer 300 captures the image using image capture device 304, illustratively a camera. The image capture device 304 in conjunction with capturing the image also records associated image metadata 305 including a timestamp indicating the time of image capture in coordinated universal time (UTC), the location of image capture specified by current latitude and longitude coordinates of the image capture device 304, characteristics defining the field of view 301 including direction, tilt and angle, and a description of the type of image sensor used in the imager of the capture device 304, including its resolution in terms of number of pixels. The metadata can include additional or alternative information, such as additional specifications of the capture device 304.

Notifications are provided to respective ones of the subjects 302 and are handled as indicated at 306. Each of the subjects 302 is assumed to have a corresponding subject device that is generally configured in a manner similar to the subject device 102 as previously described. Accordingly, each such subject device includes a notification receiver that processes notifications received from capture devices.

It should be noted in this regard that controlled provision of a notification to a subject as set forth in step 202 of the FIG. 2 process may involve transmitting a notification from a capture device to a subject device, with a notification receiver of the subject device determining if the notification should be presented or otherwise made apparent to the corresponding subject, for example, via a user interface of the subject device. The notification receiver may alternatively determine that the received notification should be ignored, in which case it does not make the notification apparent to the subject.

The subject device associated with subject 302-1 receives the notification but as indicated at 306-1 its notification receiver ignores the notification upon determining based on the image metadata and additional information stored in the subject device that the subject device was outside the specified field of view 301 at the time of image capture.

The subject device associated with subject 302-2 receives the notification. As indicated at 306-2 its notification receiver saves the notification for later review.

The subject device associated with subject 302-3 receives the notification but as indicated at 306-3 its notification receiver ignores the notification upon determining that the subject at the time of image capture was too far away to be identified given the camera specifications as provided in the image metadata.

In conjunction with provision of the notification to the subject regarding the captured image in step 202, the process may also provide the subject with access to at least a portion of the captured image. For example, the subject may be provided with a cropped or blurred version of the captured image, a portion of the captured image containing only the subject, or a portion of the captured image containing only the subject and one or more additional subjects that have previously consented to the particular use of the captured image.

A number of techniques can be applied to protect the privacy of the photographer or other user operating the capture device 104. Subjects in some embodiments have an ability to review and control the use of images in which they appear, but do not have an ability to review or control the use of images in which they do not appear. As mentioned previously, the "peer-to-peer notification" and "broadcast notification" approaches in some circumstances can potentially create dramatically more notifications than necessary. This is addressed by allowing subjects to filter or prioritize notifications so as to limit the presented notifications to those that are applicable to them. However, it is also appropriate to ensure that the set of reviewers for a given captured image is a subset of the subjects in the given image and that non-subjects are not permitted as reviewers of the given image.

This can be achieved, for example, by requesting verification that the subject device 102 was sufficiently near a location at which the image was captured at a time at which the image was captured. At least a portion of the captured image is provided to the subject responsive to receipt of the requested verification, and consent to the particular use is requested based on the provided portion of the captured image. Such an arrangement requires a subject to prove his or her location at the time the image was captured in order to have access to images in which that location is in the field of view.

In order to prevent subjects from lying about their locations in order to see images that they would not otherwise be able to access, the proof or other verification can include hardware-signed GPS coordinates, information about nearby devices which would only be available at the given time and place, or statements from other user devices or associated infrastructure such as access points or cellular towers that the subject device in question was indeed seen at that place and time. The capture device 104 could also scan for nearby devices and perhaps even exchange keys using the above-noted SDDR protocol, allowing the capture device 104 and subject device 102 to later recognize and authenticate one another. Any proof of location may be configured so as to be deniable, which would prevent the photographer from proving to anyone else that the subject was present at a location.

Another technique for protecting photographer privacy involves obtaining information characterizing the subject and comparing the captured image to the obtained information. At least a portion of the captured image is provided to the subject responsive to a result of the comparing, and consent to the particular use is requested based on the provided portion of the captured image. The information characterizing the subject may comprise at least one of an existing image of the subject, a facial recognition model generated from one or more existing images of the subject, and information specifying one or more prominent facial features of the subject.

As a more particular example, facial recognition could be used to protect the privacy of the photographer by limiting reviewing rights. In the centralized notification case in particular, users could submit several pictures of themselves to the central server 110, allowing the central server 110 to build a model of that user and only allow review of pictures with a positive match. This may require that the central server 110 be a trusted entity in the system.

To avoid this requirement it is instead possible to perform private set intersection over detected faces. More particularly, the photographer could create notifications with a description of all the faces detected in the captured image and reviewers could provide a description of their face to a private set intersection algorithm that only outputs the intersection. Here a possible concern relates to users trying to register using images of others so as to be able to review consent requests for others. This concern can be potentially addressed by leveraging government-issued photo identifications. One or more additional security features can be included to balance the privacy rights of the subject and photographer while ensuring the system cannot be co-opted for malicious intent.

In providing consent in step 204 of the FIG. 2 process, the subject should know what he or she is consenting to in order to provide informed consent. Accordingly, the subject in some embodiments is permitted to review any image in which he or she appears. In the peer-to-peer or broadcast notification approaches, at least a portion of the image itself could be transmitted along with the notification. As another example, a URL or other pointer to a web site where the image can be reviewed could be provided. In the case of centralized notification, the image may be hosted on the central server 110.

Consent should not be required in real time, but if a reasonable attempt has been made to contact the subjects, consent may be assumed after some delay. For subjects that do wish to review the images in which they appear, that review should be done without impacting the rights of any other subject. This can be achieved in a number of ways.

For example, reviewers could be given a complete view of the image with the faces of other subjects blurred out or removed. This provides the reviewer nearly full context regarding the image.

The faces of subjects who have already provided their consent could be included in the image reviewed by the reviewer. The reviewer then learns who has provided consent, but also gets a more complete picture of the image as details are not obscured. This could be important if the reviewer would be ashamed or embarrassed by the actions of other people in the image which may not be visible if blurred out.

As another example, the reviewer could see a cropped image where only his or her likeness was visible in order to confirm identity. In some cases the reviewer could provide or deny consent on this basis alone. This technique could also be used as a filter, ensuring that the above-noted facial recognition algorithm identified the subject correctly, for example, before allowing further review of the image.

The reviewer could be presented a complete image without blurring under the assumption that all subjects will have to consent for the image to be shared, and that by being in the image the reviewer could have seen anything contained in the image. This is somewhat problematic as attackers may leverage such a system to obtain a photo of someone at a particular location by leaving a device at that location to collect notifications. This argument is also weakened by the fact that it may allow someone present a different vantage point of the scene which they did not actually have access to physically.

In some implementations of the FIG. 2 process, reviewers can either provide consent or withhold consent in an all-or-nothing way. However, other implementations can provide finer control over the usage of an image when consent is granted as well as various options when consent is withheld.

To this end, when consent is granted by the subject, various limitations on that consent may also be enforced. Examples of different types of consent that could be provided in step 204 of the FIG. 4 process include the following:

1. Reviewers can consent broadly, allowing the image to be used without limitation.

2. Reviewers could consent for the image to be used publicly as long as the photographer is not profiting from the image (e.g., grant a non-commercial license).

3. Consent could be limited in the scope of how the image is shared. For example, reviewers could allow the image to be shared with friends of the photographer, but not posted publicly for general viewing. As another example, the image could be shared with everyone in the image who provides consent, but not outside a specified group.

4. Consent could be limited to private use only, where only the photographer (or photographer and reviewer) has rights to view the image.

5. Consent could also carry additional requirements. For example, consent could be provided for public, non-commercial use but additionally require notification to the reviewer any time the image is viewed.

When consent is withheld, the reviewer can deny consent completely and request that he or she be removed from the image entirely or that the image itself be destroyed.

If a reviewer chooses to withhold his or her consent, it may be possible to remove his or her likeness and still retain the image for the photographer's use. Examples of options that may be provided in the case of withheld consent including the following:

1. If there are multiple images of the same scene, some without the reviewer who did not provide consent, it may be possible to use image processing tools, such as the "Eraser Mode" tool available in certain Samsung cameras, to digitally remove the reviewer from the picture.

2. A reviewer may choose to blur out his or her image and then grant consent to the modified image. This provides reviewers the ability to specify how much blurring is required to make them comfortable, and that level can be adjusted for different uses. For example, a reviewer may allow the unblurred image to be shared with all the subjects in the image, a slightly blurred image to be shared with friends of any of the subjects, and a highly blurred image to be posted publicly.

3. If a reviewer withholds consent, the photographer may be able to crop the image to remove the reviewer from appearing in the resulting image.

There are a number of ways in which a reviewer's selections could be enforced, although such enforcement mechanisms are provided on a best-effort basis, and in fact it would be easy to build a camera that doesn't create the notifications and never uploads the images to a system where subject rights could be enforced. Examples of such enforcement mechanisms are as follows:

1. Enforcement can be required by sharing sites (which may be different from or integrated with the review site), requiring any image submitted for proposed sharing to include the corresponding consents from all the subjects in the image. Some sites may offer both services (i.e., the ability to review and share) as a differentiator to attract new users.

2. Applicable laws could mandate the use of such technology, as the above-noted HR 414 attempted to do. This would compel camera manufacturers and other similar entities to implement subject consent functionality.

3. Camera manufacturers could implement subject consent functionality by selling cameras that store blurred, watermarked, or encrypted images, along with the applicable notifications. A subject's consent (e.g., in the form of a digital signature on the notification) could generate a key needed to un-blur the image.

4. Photo editing and organization software could also provide an enforcement point, checking that each image also has the necessary consents before it will save the image in an exportable format.

In some embodiments, one or more policies can be established for certain cameras or for a specified time period. For example, while working with a photographer, a subject may specify before the photo session that consent is granted for all photographs taken in the next hour using the photographer's camera. Or during a wedding, the bride and groom may consent to all photographs taken by any camera in proximity to the ceremony.

It is also possible for one or more policies to be established for cases in which the reviewer cannot be contacted or is unwilling or unable to review the image. Under current practice, the default is clearly consent as subjects are typically given little to no notification when their likeness is captured in an image. One alternative option would be implicit consent after a fixed amount of time has passed since a best-effort attempt was made to contact the subject.

An override option can be provided in some embodiments to address various practical use cases. For example, a bank surveillance camera when accompanied by a notification sign should be able to capture images that are not subject to review. Other similar cases where the user has no expectation of privacy should not generate notifications nor allow the subject to review the captured images.

As noted above, the process in the FIG. 4 embodiment does not provide notifications to the subjects in a captured image. Instead, one or more default policies of the subject are taken into account in determining whether or not to actually capture a potential captured image. Such an embodiment is also referred to herein as implementing a "proactive consent" approach. The process as shown includes steps 400, 402 and 404, which are illustratively assumed to be performed by the capture device 104. However, like the steps of the FIG. 2 process, one or more of these steps may alternatively be performed at least in part by other components of the system 100 in other embodiments.

In step 400, at least one subject is detected in a potential captured image. The potential captured image is assumed to comprise an image presented in a viewfinder of the capture device 104 prior to image capture, possibly in conjunction with at least one of a framing operation, a focusing operation or another type of operation of the capture device 104 typically carried out prior to image capture. The viewfinder and associated framing or focusing operations are illustratively implemented at least in part utilizing the imager 118.

As in the FIG. 2 embodiment, the detection of the subject in the potential captured image is performed by the subject detection module 124. This may involve using well-known image processing techniques such as facial recognition algorithms, possibly utilizing information to facilitate identification, such as templates or other types of known information relating to one or more potential subjects.

Again, "detection" in this step and elsewhere herein in the context of module 124 is intended to be broadly construed so as to encompass one or both of general detection indicative of the presence of some subject in the captured image, and specific detection identifying the subject in the captured image as a particular individual. Accordingly, facial recognition algorithms are not required.

As mentioned previously, thermal imaging functionality of the capture device can be used to facilitate detection of subjects, in addition to or in place of other types of image processing functionality of the capture device, although in this embodiment in a potential captured image rather than in an actual captured image.

In step 402, one or more default policies associated with the subject are determined. For example, information regarding such policies can be obtained from module 116 of the subject device 102 as well as similar modules in other devices within sufficient proximity of the potential image capture location. A given such default policy, for example, can indicate default granting of consent or default withholding of consent. Default policies can also indicate various intermediate levels of consent.

In step 404, information relating to the one or more default policies is presented to a photographer or other user associated with the capture device 104 for use in determining if the potential captured image should actually be captured. The capture device 104 may be configured to prevent actual capture of the potential captured image if the one or more default policies are not satisfied. Other enforcement mechanisms can be implemented, in place of or in addition to prevention of image capture.

An example of a viewfinder of a capture device presenting a potential captured image is shown in FIG. 5. In this example, a viewfinder 500 associated with a capture device such as capture device 104 presents a potential captured image 502. The potential captured image 502 is presented along with information relating to consent status indications for respective subjects detected in the potential captured image.

There are five subjects detected in the potential captured image 502. Two of the subjects are determined by the capture device to have granted consent to the use of their respective likenesses in the potential captured image 502, based on their respective default policies, and accordingly are shown with superimposed check marks in the viewfinder 500. Another two of the subjects are determined by the capture device to have withheld consent to the use of their respective likenesses in the potential captured image 502, based on their respective default policies, and accordingly are shown with superimposed prohibition marks in the viewfinder 500. For the final one of the five subjects, that is, the one facing away from the imager of the capture device such that his or her face is not visible in the potential captured image 502, a warning indicator is displayed in the viewfinder in association with that subject.

The warning indicator can have one or more of a variety of different interpretations, depending on the implementation. For example, the warning indicator can indicate an intermediate level of consent between all-or-nothing grant or denial of consent, such as consent granted with limited rights or with various limits set on recognizability of the subject. It is also possible that the warning indicator could indicate an error, an inconclusive identification process, or other similar condition relating to the corresponding subject. The warning indicator can therefore be used to provide feedback to the photographer regarding the consent status of particular subjects detected in the potential captured image. Multiple warning indicators of different types can be used in a given embodiment to convey different levels of intermediate consent, different types of warnings, or other consent-related information.

In some embodiments, the warning indicator is interpreted as a denial of consent, triggering prevention of image capture or another suitable enforcement mechanism, additional examples of which will be described below.

It should again be noted that specific identification of a subject as a particular individual, using facial recognition algorithms or other similar techniques, is not required in the FIG. 5 embodiment or other embodiments herein. As mentioned previously, detection of a subject can be based on a general determination that a subject is present. Accordingly, a capture device as disclosed herein can be configured to detect the presence of a subject in the potential captured image, without the need for facial recognition or similar techniques. The capture device can then query nearby subject devices in order to determine one or more default policies associated with the detected subject.

However, it is to be appreciated that facial recognition can be utilized in such an embodiment to evaluate whether or not the one or more default policies of the subject are satisfied. For example, assume that the subject facing away from the imager in the potential captured image 502 of FIG. 5 has established a default policy indicating that consent is granted as long as the face of the subject is not visible in the image. A facial recognition algorithm can be used to confirm that for this subject the face is not visible in the potential captured image and thus the default policy of the subject is satisfied.

In one possible operating scenario of the FIG. 4 embodiment, upon detection of one or more subjects in a potential captured image, a determination is initially made as to whether or not the one or more default policies of each of the detected subjects are satisfied. If there is at least one unsatisfied default policy, the photographer can adjust the potential captured image using the viewfinder and one or more additional focusing operations or other types of operations of the capture device until there are no unsatisfied default policies relating to any subject remaining in the adjusted potential captured image. The photographer can then capture the adjusted potential captured image.

Accordingly, if a subject has specified a default policy, that information could be provided to the capture device 104 at the time of image capture. When the imager focuses on a potential captured image, the capture device could query all devices nearby for default consent status. The location and policy of subjects could then be fed back to the viewfinder, showing the photographer which subjects grant consent by default and which ones withhold it by default. This allows the photographer to potentially reframe, refocus or otherwise adjust his or her proposed picture to avoid subjects that do not wish to be photographed.

As another example, consider a subject implementing a default policy that indicates "deny consent when a proposed image is to be captured on or near a beach." Then, when a photographer tries to take a picture of the subject on or near a beach, the viewfinder presents an indication that this particular subject is in a "red" or consent denied condition. The photographer therefore does not take the picture but instead reframes, refocuses or otherwise adjusts the imager until all subjects are in a "green" or consent granted condition. As noted above, the imager may be configured so as to be prevented from capturing images having one or more subjects in the "red" condition within the current field of view of the imager. In such an arrangement, the capture device 104 does not send notifications to any subjects but instead protects subject privacy by preventing capture of the image.

As indicated above, a potential captured image can be reframed, refocused or otherwise adjusted until default consent policies for all detected subjects are satisfied. A given such adjustment can illustratively involve zooming out or capturing fewer pixels in order to meet a "blurring threshold" that is specified as part of the default policy determined for one or more detected subjects. Additionally or alternatively, a warning could be provided to inform the photographer that he or she cannot share the image publically, but that other types of uses are allowed.

Other types of enforcement mechanisms can be utilized. For example, other types of warnings could be provided to the photographer indicating that the one or more default policies are not satisfied. Also, instead of preventing actual capture of the potential captured image if the one or more default policies are not satisfied, the capture device could watermark, blur, crop or otherwise alter the potential captured image in conjunction with its capture if the one or more default policies are not satisfied. It is also possible to store the one or more default policies in conjunction with capture of the potential captured image so as to facilitate limitations on further usage of the captured image. Various combinations of these and other enforcement mechanisms could be used in a given embodiment to ensure subject consent to particular uses of captured images.

The capture device 104 of the FIG. 1 embodiment can be adapted in a straightforward manner to implement proactive consent embodiments such as those described above in conjunction with the FIG. 4 process.

The particular processing operations and other system functionality described in conjunction with the flow diagrams of FIGS. 2 and 4 are presented by way of illustrative example only, and should not be construed as limiting the scope of the invention in any way. Alternative embodiments can use other types of processing operations for ensuring appropriate consent of subjects to use of their respective likenesses in captured images. For example, the ordering of the process steps may be varied in other embodiments, or certain steps may be performed concurrently with one another rather than serially. Also, the process steps may be repeated periodically in conjunction with respective distinct image capture instances.

One or more of the illustrative embodiments described herein provide effective techniques for obtaining subject consent for particular uses of captured images. For example, in some embodiments subjects are provided with notifications that their likenesses appear in captured images and mechanisms to review the images and provide their consent. In other embodiments, proactive consent is obtained prior to image capture. In both notification-based consent and proactive consent embodiments, privacy of the subjects as well as the photographers or other users that capture images are protected.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing platforms, and processing device configurations. Also, different arrangements of imagers, subject consent processes, consent provision and determination modules, notification thresholds, consent conditions and default policies may be used. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
   detecting at least one subject in a captured image;
   providing a notification to the subject regarding the captured image; and
   permitting the subject to consent to a particular use of the captured image by another party;
   wherein providing a notification to the subject regarding the captured image further comprises:
   determining one or more automatic consent conditions relating to the subject; and
   providing the notification to the subject only if the one or more automatic consent conditions are not met; and
   wherein said detecting, providing and permitting are performed by at least one processing device comprising a processor coupled to a memory.

2. The method of claim 1 wherein providing a notification to the subject regarding the captured image comprises providing the notification from a capture device utilized to capture the image to a subject device associated with the subject.

3. The method of claim 2 wherein providing the notification from the capture device to the subject device comprises providing the notification through at least one intermediate device utilizing connections established between respective pairs of the capture, intermediate and subject devices.

4. The method of claim 2 wherein providing the notification from the capture device to the subject device comprises initiating a key exchange between the capture device and the subject device in conjunction with the notification so as to support subsequent secure communication between the capture device and the subject device.

5. The method of claim 1 wherein providing a notification to the subject regarding the captured image comprises providing the notification from a server to a subject device associated with the subject.

6. The method of claim 1 wherein the other party comprises a photographer associated with a capture device utilized to capture the image.

7. The method of claim 1 wherein permitting the subject to consent to a particular use of the captured image comprises:
   requesting verification that a subject device associated with the subject was sufficiently near a location at which the image was captured at a time at which the image was captured;
   providing at least a portion of the captured image to the subject responsive to receipt of the requested verification; and
   requesting the consent to the particular use based on the provided portion of the captured image.

8. The method of claim 1 wherein permitting the subject to consent to a particular use of the captured image comprises:
   obtaining information characterizing the subject;
   comparing the captured image to said obtained information; and
   providing at least a portion of the captured image to the subject responsive to a result of the comparing; and
   requesting the consent to the particular use based on the provided portion of the captured image.

9. The method of claim 8 wherein the information characterizing the subject comprises at least one of:
   an existing image of the subject;
   a facial recognition model generated from one or more existing images of the subject; and
   information specifying one or more prominent facial features of the subject.

10. The method of claim 1 wherein providing a notification to the subject regarding the captured image further comprises providing the subject with access to at least a portion of the captured image in conjunction with the notification.

11. The method of claim 10 wherein said at least a portion of the captured image comprises at least one of:
   a cropped version of the captured image;
   a blurred version of the captured image;
   a portion of the captured image containing only the subject; and a portion of the captured image containing only the subject and one or more additional subjects that have previously consented to the particular use of the captured image.

12. The method of claim 1 wherein permitting the subject to consent to a particular use of the captured image comprises at least one of:
   permitting the subject to provide partial consent to the particular use subject to one or more specified limitations;
   permitting the subject to provide consent to the particular use subject to one or more additional notification requirements; and
   permitting the subject to control generation of a modified version of the captured image and to consent to the particular use of the modified version of the captured image.

13. The method of claim 1 further comprising limiting use of the captured image based at least in part on presence or absence of the consent of the subject.

14. The method of claim 1 wherein the consent of the subject to the particular use is in the form of a digital signature generated on at least a portion of the notification.

15. An article of manufacture comprising a non-transitory processor-readable storage medium having stored therein program code of one or more software programs, wherein the program code when executed by at least one processing device causes said at least one processing device to perform the method of claim 1.

16. A method comprising:
   detecting at least one subject in a captured image;
   providing a notification to the subject regarding the captured image; and
   permitting the subject to consent to a particular use of the captured image by another party;
   wherein providing a notification to the subject regarding the captured image further comprises:
   determining one or more notification thresholds relating to the subject; and
   providing the notification to the subject only if the one or more notification thresholds are met;
   wherein at least one of the one or more notification thresholds is established by the subject; and
   wherein said detecting, providing and permitting are performed by at least one processing device comprising a processor coupled to a memory.

17. The method of claim 16 wherein the one or more notification thresholds comprise at least one of:
   a threshold based at least in part on identifiability of the subject in the captured image;
   a threshold based at least in part on recognition of the subject in the captured image by a facial recognition algorithm;
   a threshold based at least in part on prioritization of image type; and
   a threshold based at least in part on the particular use of the captured image for which consent is sought.

18. A method comprising:
   detecting at least one subject in a potential captured image;
   determining one or more default captured image consent policies associated with the subject;
   presenting information relating to the one or more default captured image consent policies for use in determining if the potential captured image should actually be captured;
   wherein at least a given one of the one or more default captured image consent policies is established by the subject and indicates consent by the subject to a particular usage of a captured image by another party; and
   wherein said detecting, determining and presenting are performed by at least one processing device comprising a processor coupled to a memory.

19. The method of claim 18 wherein the potential captured image comprises an image presented in a viewfinder of a capture device prior to image capture in conjunction with a focusing operation of the capture device.

20. The method of claim 19 wherein the capture device is configured for at least one of:
   presenting a warning that the one or more default captured image consent policies are not satisfied;
   preventing actual capture of the potential captured image if the one or more default captured image consent policies are not satisfied;
   altering the potential captured image in conjunction with its capture if the one or more default captured image consent policies are not satisfied; and
   storing the one or more default captured image consent policies in conjunction with capture of the potential captured image so as to facilitate limitations on usage of the captured image.

21. The method of claim 18 further comprising:
   determining whether or not the one or more default captured image consent policies are satisfied;
   adjusting the potential captured image until there are no unsatisfied default captured image consent policies relating to any subject remaining in the adjusted potential captured image; and
   capturing the adjusted potential captured image.

22. The method of claim 18 wherein determining one or more default captured image consent policies comprises obtaining at least a portion of said one or more captured image consent default policies in a capture device from one or more additional devices in communication with the capture device.

23. An apparatus comprising:
   at least one processing device comprising a processor coupled to a memory;
   said at least one processing device being configured to detect at least one subject in a captured image, to provide a notification to the subject regarding the captured image, and to permit the subject to consent to a particular use of the captured image by another party;
   wherein providing the notification to the subject regarding the captured image further comprises:
   determining one or more automatic consent conditions relating to the subject; and
   providing the notification to the subject only if the one or more automatic consent conditions are not met.

24. The apparatus of claim 23 wherein providing a notification to the subject regarding the captured image further comprises:
   determining one or more notification thresholds relating to the subject; and
   providing the notification to the subject only if the one or more automatic consent conditions are not met and the one or more notification thresholds are met;
   wherein at least one of the one or more notification thresholds is established by the subject.

25. The apparatus of claim 24 wherein the one or more notification thresholds comprise at least one of:
   a threshold based at least in part on identifiability of the subject in the captured image;

a threshold based at least in part on recognition of the subject in the captured image by a facial recognition algorithm;

a threshold based at least in part on prioritization of image type; and a threshold based at least in part on the particular use of the captured image for which consent is sought.

\* \* \* \* \*